United States Patent [19]
Girardon et al.

[11] 3,899,536
[45] Aug. 12, 1975

[54] PREPARATION OF 2,4,6,2',4',6'-HEXANITRO-DIPHENYLAMINE

[75] Inventors: Hubert Girardon, Villeneuve les Avignon; Jean Marie Emeury, Sorgues, both of France

[73] Assignee: Societe Nationale des Poudres et Explosifs, Paris, France

[22] Filed: May 8, 1972

[21] Appl. No.: 251,475

[30] Foreign Application Priority Data
May 18, 1971 France .............................. 71.17872

[52] U.S. Cl. ................................................ 260/576
[51] Int. Cl. ............................................ C07c 87/60
[58] Field of Search ................................. 260/576

[56] References Cited
UNITED STATES PATENTS
1,326,947  1/1920  Marshall ............................. 260/576
2,612,523  9/1952  Dijkema ............................. 260/576

OTHER PUBLICATIONS

Zbarskii et al., "Journal of Organic Chemistry of the U.S.S.R.," Vol. 1, pp. 1249–1250 (1965).

*Primary Examiner*—Lewis Gotts
*Assistant Examiner*—S. P. Williams
*Attorney, Agent, or Firm*—Bucknam and Archer

[57] ABSTRACT

A process for preparing substantially pure 2,4,6,2',4',6'-hexanitro-diphenylamine, commonly known as Hexyl, a thermostable explosive, comprises two nitration stages, in the first of which 2,4,6-trinitrodiphenylamine is nitrated with relatively dilute nitric acid to form pentanitro-diphenylamine and in the second of which the intermediate product is nitrated with concentrated nitric acid. The Hexyl obtained is substantially free of undesired isomers.

8 Claims, No Drawings

PREPARATION OF 2,4,6,2',4',6'-HEXANITRO-DIPHENYLAMINE

This invention is concerned with a process for the preparation of 2,4,6,2',4',6'-hexanitrodiphenylamine, which is commonly known as Hexyl.

In recent years research has been directed towards finding thermostable explosives, that is explosives which have a high melting point and low rate of decomposition at elevated temperatures and which are used, for example, in deep drilling. Hexyl is one of the thermostable explosives on which research has been carried out.

We have studied the conditions that must be satisfied by a molecule of hexanitro-diphenylamine if it is to be thermostable and this study has shown the importance of the relative positions of the nitro groups in relation to one another on the phenyl rings and further that only the symmetrical molecule nitrated in the 2,4,6,2',4',6'-positions is stable, the isomers nitrated in different positions being thermally unstable.

Known Hexyl preparation processes all result in a mixture of isomers which has to be purified to eliminate those isomers which are responsible for the lack of thermal stability in the resulting mixture.

It will readily be seen that this purification is difficult and expensive since molecules of extremely similar constitution have to be separated by means of crystallisation processes which are difficult and laborious, in particular, because of the toxicity of the product requiring to be isolated.

Hexyl has hitherto been prepared by two different processes:

a. by nitration of diphenylamine with nitric acid in the presence of sulphuric acid:

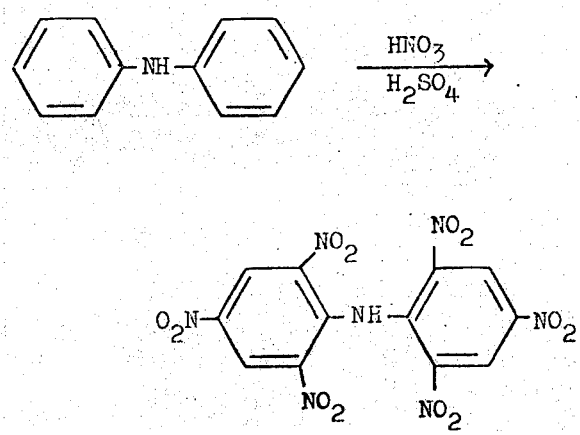

This nitration is, however, difficult and is sometimes even dangerous and results in a mixture of thermally unstable isomers.

b. by condensation of dinitro-chlorobenzene with aniline:

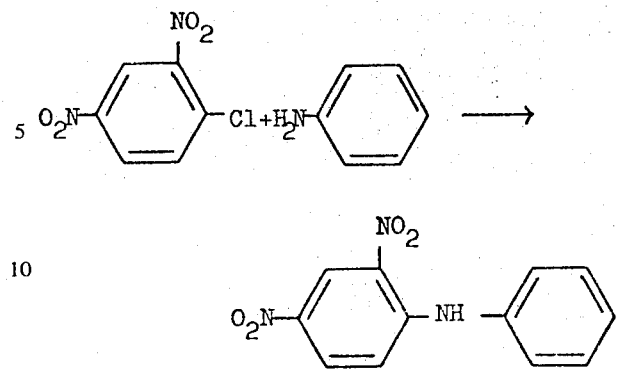

followed by nitration of the resulting dinitrodiphenylamine in known matter and, more particularly, using a sulpho-nitric mixture.

This second method is a substantial improvement over the first method using diphenylamine as the starting material and is the only one which is used in industry, but although the condensation reaction is easier than the fist method, the resulting industrial product is still a mixture of isomers having inadequate thermal stability. In addition, the industrial utilisation of dinitro-chlorobenzene should be avoided, if possible, because of the skin diseases it causes.

We have now developed an improved process for the preparation of Hexyl whereby this product can be obtained directly in a practically pure state.

According to the present invention, we provide a process for the preparation of Hexyl, which comprises a first nitration stage in which 2,4,6-trinitro-diphenylamine is nitrated to pentanitrodiphenylamine with nitric acid having a concentration of from 45 to 65% by weight, preferably 50 to 55% by weight, using a nitric acid: trinitro-diphenylamine weight ratio of from 4 to 10, preferably 5 to 7, at a temperature of from 70° to 90°C, preferably 75° to 80°C, nitration being terminated after 1 to 3 hours, preferably 1 to 1½ hours, and a second nitration stage in which the pentanitro-diphenylamine obtained is nitrated to 2,4,6,2',4',6'-hexanitro-diphenylamine with nitric acid having a concentration of from 90 to 100%, preferably 97 to 99% by weight, using a nitric acid: pentanitro-diphenylamine weight ratio of from 4 to 10, preferably 5 to 7, at a temperature of from 50° to 70°C, preferably 60° to 65°C, nitration being terminated after ½ to 3 hours, preferably 1 to 2 hours.

The resulting Hexyl is then separated from the nitration reaction mixture, for example by crystallisation.

If the process is carried out at temperatures above the indicated maxima, there is a danger of the products being oxidised and nitrous fumes being formed, whilst at temperatures below the indicated minima nitration is very slow and there is a low yield.

By using 2,4,6-trinitro-diphenylamine as the starting material, the benefit of the orientation effect of the three nitro groups already present on one of the phenyl rings of the molecule, towards nitration in the 2',4',6'-positions of the other phenyl ring, is obtained. We have also found that by carrying out nitration in two stages, the formation of thermally unstable isomers is reduced as far as possible. Thus, whilst direct nitration of 2,4,6-trinitro-diphenylamine with 98% concentrated nitric acid gives a low yield of the final product with aptrinitro-diphenylamine were obtained; yield 96% m.p. 180°C.

50 g of 2,4,6-trinitro-diphenylamine obtained in the previous stage were introduced over a period of 30 minutes into 300 g of nitric acid (having a 54% $HNO_3$ content) at 80°C, and the reaction was continued for 1½ hours at 80°C.

The pentanitro-diphenylamine formed was separated by dilution of the reaction mixture with water and filtration. 60.1 g of a product melting at 189.3°C were obtained, i.e., a yield of pentanitro-diphenylamine of 93%.

50 g of pentanitro-diphenylamine obtained in the previous stage were introduced into 300 g of nitric acid (97% $HNO_3$ content) at 35°C. The reaction mixture was heated to 65°C and this temperature was maintained for 1 hour. After cooling, dilution with water, filtration and washing with water, 50 g of pure 2,4,6,2',4',6'-hexanitro-diphenylamine were obtained; 90% yield, m.p. 252°C as against 248°C in the case of the commercial product obtained by the dinitrochlorobenzene method.

The vacuum stability of the resulting Hexyl was measured and the following results were obtained:
  at 200°C, after 200 hours, volume evolved = 1.5 cc/g of Hexyl
  at 220°C, after 24 hours, volume evolved = 7 cc/g of Hexyl
  at 230°C, after 8 hours, volume evolved = 15 cc/g of Hexyl.

By way of comparison, in the same vacuum stability test carried out on commercial Hexyl obtained from dinitro-chloro-benzene (the second conventional method described above) at 200°C, the volume of gas evolved after 200 hours was 8 cc/g of product, and after purification of this Hexyl by recrystallisation from acetone, the volume evolved at 200°C after 200 hours preciable formation of thermally unstable isomers, the process according to the invention gives only 2,4,6,2',4'-pentanitro- and 2,4,6,2',6'-pentanitro-diphenylamines in the first nitration stage and only 2,4,6,2',4',6'-hexanitro-diphenylamine in the second nitration stage with good yields.

2,4,6-Trinitro-diphenylamine is preferably obtained by condensation of picryl chloride (or 2,4,6-trinitro-chloro-benzene) with aniline in a methanolic medium using an aniline: picryl chloride molar ratio of at least 2, and preferably from 2.1 to 2.3, at a temperature of from 55° to 65°C, preferably 60° to 62°C, for ½ to 2 hours, preferably 1 to 1½ hours.

In order that the invention may be more fully understood, the following example is given by way of illustration only:

Example 24.75 g of picryl chloride were dissolved in 110 g of methanol, the solution was heated to 50°C, and 20.5 g of aniline were poured into it; the reaction was terminated after heating for 1 hour at 60°C. After cooling, filtration and washing with methanol, 29.2 g of 2,4,6- was still 7 cc/g of product.

What we claim is:

1. A process for the preparation of Hexyl of melting point 252°C which consists of a first nitration stage in which 2,4,6-trinitro-diphenylamine is nitrated to pentanitrodiphenylamine with aqueous nitric acid having a concentration of from 45 to 65% of nitric acid by weight using a nitric acid: trinitro-diphenylamine weight ratio of from 4 to 10 at a temperature of from 75°–80°C, nitration being terminated after 1 to 3 hours, and a second nitration stage in which the pentanitrodiphenylamine obtained is nitrated to 2,4,6,2',4',6'-hexanitro-diphenylamine with nitric acid having a concentration of from 90 to 100% by weight of nitric acid using a nitric acid: pentanitro-diphenylamine weight ratio of from 4 to 10 at a temperature of from 50° to 70°C, nitration being terminated after ½ to 3 hours.

2. A process according to claim 1, in which the concentration of the nitric acid used in the first stage is from 50 to 55% by weight.

3. A process according to claim 1, in which the weight ratio used in the first nitration stage is from 5 to 7.

4. A process according to claim 1, in which the first stage is terminated after 1 to 1½ hours.

5. A process according to claim 1, in which the concentration of the nitric acid used in the second stage is from 97 to 99% by weight.

6. A process according to claim 1, in which the weight ratio used in the second nitration stage is from 5 to 7.

7. A process according to claim 1, in which the second stage is carried out at a temperature of from 60° to 65°C.

8. A process according to claim 1, in which the second stage is terminated after 1 to 2 hours.

* * * * *